(12) United States Patent
Matsushita

(10) Patent No.: US 9,213,109 B2
(45) Date of Patent: Dec. 15, 2015

(54) RADIATION MEASUREMENT DEVICE

(75) Inventor: Eri Matsushita, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 14/381,385

(22) PCT Filed: May 24, 2012

(86) PCT No.: PCT/JP2012/063296
§ 371 (c)(1),
(2), (4) Date: Aug. 27, 2014

(87) PCT Pub. No.: WO2013/175602
PCT Pub. Date: Nov. 28, 2013

(65) Prior Publication Data
US 2015/0090892 A1   Apr. 2, 2015

(51) Int. Cl.
*H01J 47/00* (2006.01)
*G01T 1/185* (2006.01)
(Continued)

(52) U.S. Cl.
CPC .............. *G01T 1/2914* (2013.01); *G01T 1/02* (2013.01); *G01T 1/185* (2013.01); *G01T 1/2935* (2013.01)

(58) Field of Classification Search
CPC .......... G01T 1/2914; G01T 1/185; G01T 1/02
USPC ....................................................... 250/389
See application file for complete search history.

(56) References Cited

U.S. PATENT DOCUMENTS 5,345,083 A    9/1994  De Koning
2005/0184244 A1*  8/2005  Yoshimuta et al. ...... 250/370.01
(Continued)

FOREIGN PATENT DOCUMENTS

JP    1-098985 A    4/1989
JP    2-110395 A    4/1990
JP    4-004549 A    1/1992
(Continued)

OTHER PUBLICATIONS

International Search Report (PCT/ISA/210) mailed on Aug. 28, 2012, by the Japanese Patent Office as the International Searching Authority for International Application No. PCT/JP2012/063296.
(Continued)

*Primary Examiner* — Yara B Green
*Assistant Examiner* — Abra Fein
(74) *Attorney, Agent, or Firm* — Buchanan Ingersoll & Rooney PC

(57) ABSTRACT

A radiation measurement device comprising a case which is formed of insulating material to be flat, a common electrode substrate having a common electrode which is provided at one surface and a signal electrode substrate having a plurality of signal electrodes which are provided at one surface, wherein the common electrode substrate and the signal electrode substrate are arranged parallel to the direction in which the case extends flat so as for the common electrode and the signal electrode to face each other having a gap, each signal line is connected to each of the plurality of signal electrodes, each of the signal lines is led out from a signal line leading out part which is provided at the case to outside of the case, wherein an inner surface or an outer surface of a case wall which forms the case is covered with a conductor.

8 Claims, 9 Drawing Sheets

(51) Int. Cl.
*G01T 1/29* (2006.01)
*G01T 1/02* (2006.01)

(56) References Cited

U.S. PATENT DOCUMENTS

2009/0200476 A1    8/2009   Brusasco et al.
2011/0049376 A1*   3/2011   Zhang et al. ............. 250/370.13

FOREIGN PATENT DOCUMENTS

| JP | 6-096721 A | 4/1994 |
| JP | 7-280944 A | 10/1995 |
| JP | 2003-036995 A | 2/2003 |
| JP | 2003-047666 A | 2/2003 |
| JP | 2010-156671 A | 7/2010 |
| JP | 2010156671 A * | 7/2010 |
| JP | 2010-175309 A | 8/2010 |
| WO | WO 2007/012147 A2 | 2/2007 |

OTHER PUBLICATIONS

Taiwanese Office Action dated Jul. 29, 2014 with English language translation, pp. 1-3.
Office Action issued on Jun. 2, 2015, by the Japanese Patent Office in corresponding Japanese Patent Application No. 2014-516580, and partial English Translation of the Office Action. (10 pages).

* cited by examiner

RADIATION MEASUREMENT DEVICE

TECHNICAL FIELD

This invention relates to a radiation measurement device, for example, a radiation measurement device which measures the dose distribution of radiation beam which is utilized for radiation therapy of cancer.

BACKGROUND ART

In performing radiation therapy of cancer, in order to confirm energy and shape of a radiation beam, such as an X ray, an electron beam, a particle beam, etc., before beams are irradiated onto a patient, it is necessary to measure the dose distribution in a water phantom simulating human body. In order to adjust a radiation irradiation system such as an accelerator, and confirm the beam energy distribution and a shape which is different between each patient, routinely, it is necessary to measure the dose distribution as quality control of radiation beam.

In conventional absorbed dose distribution measurement as disclosed in Patent Document 1, by using a water tank simulating human body and one ionization chamber at which a driving system is provided so as to be able to change a position in water, by scanning the ionization chamber, the dose distribution in water which is generated by irradiation of radiation is measured. As a result, even for measuring the dose distribution once, tremendous time and labor is required. Further, as every time a beam condition is changed, confirmation by the dose distribution measurement is required, there is a limit of number of patients to be able to treat by one irradiation device, that is, there is a limit to improve operating ratio of therapy system In order to solve the above-mentioned problems, as a device which can measure the dose distribution in a short time, radiation detectors or dose distribution measuring devices having various forms have been proposed. For example, in Patent Document 2, in order to measure the beam profile, a configuration of plate-shaped electrode-intermediate layer (with air hole of ionization chamber)-split electrode was proposed. In addition to the lateral direction distribution, in order to artificially measure the depth direction distribution, an energy compensation plate having an energy attenuation unit is provided at an upstream side.

Further, in Patent Document 3, it is disclosed a configuration to measure the three-dimensional distribution of radiation wherein a plurality of ion chambers at which split electrodes are arranged in a cross shape are laminated, radiation stopping power in a thickness direction of each ion chamber is made to be same as that of radiation stopping power of water having same thickness and a water phantom is not used.

In ionization chambers comprising split electrodes which are disclosed in Patent Document 2 or Patent Document 3, in a case where high speed and high resolution is intended to concurrently achieve, volume per one cell of electrode is necessarily small, consequently, sufficient signal output cannot be obtained. That is, the signal-to-noise ratio cannot be increased, and it is difficult to secure precision. As a way to counter the above-mentioned problem, in Patent Document 4, a configuration to increase the signal-to-noise ratio, wherein each dummy signal line is arranged in the vicinity of each signal line which is connected to a split electrode, by obtaining difference between an output signal of a signal line and an output signal of a dummy signal line, is disclosed.

PRIOR ART REFERENCE

Patent Document

[Patent Document 1]
 Japanese Patent Application Laid-Open No. 2003-47666
[Patent Document 2]
 International Publication WO2007/012147
[Patent Document 3]
 Japanese Patent Application Laid-Open No. 2010-175309
[Patent Document 4]
 Japanese Patent Application Laid-Open No. 2010-156671

DISCLOSURE OF THE INVENTION

Problems to be Solved by the Invention

According to Patent Document 4, in a case where a noise signal which is induced in a signal line and a noise signal which is induced in a dummy signal line are same, by obtaining the difference between the signals, the noise signal can be erased, and the signal-to-noise ratio can be increased. However, in a case of an electromagnetic noise, it is not always true that same noise signal is induced in both of signals, it is considered such that in some cases, the signal-to-noise ratio cannot be increased as expected.

This invention aims to provide a radiation measurement device, which can suppress an electromagnetic noise and can measure the dose distribution with high precision.

Means for Solving the Problems

This invention provides a radiation measurement device comprising a case which is formed of insulating material to be flat, a common electrode substrate having a common electrode which is provided at one surface and a signal electrode substrate having a plurality of signal electrodes having the configuration such that in the case, the common electrode substrate and the signal electrode substrate are arranged parallel to the direction in which the case extends flat so as for the common electrode and the signal electrode to face each other having a gap, each signal line is connected to each of a plurality of signal electrodes, each of these signal lines is led out from a signal line leading out part which is provided at the case to outside of the case, wherein an inner surface or an outer surface of a case wall which forms the case is covered with a conductor.

Advantage of the Invention

As inside of a case is electromagnetically-shielded from outside, an electromagnetic noise which is induced in a signal line is suppressed and a radiation measurement device which can measure the dose distribution with high-precision can be obtained.

EMBODIMENTS FOR CARRYING OUT THE INVENTION

Embodiment 1

Figure 1:
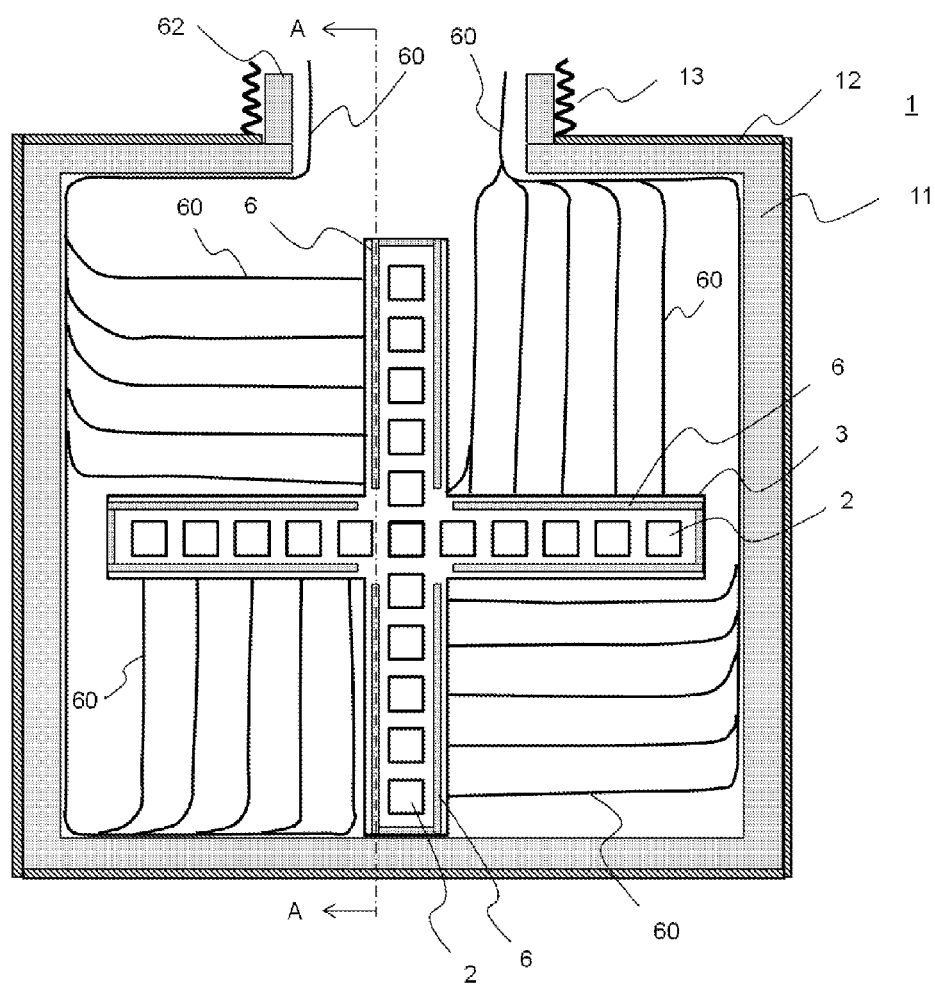
FIG. 1 is a schematic cross-sectional plane view showing an outline configuration of a radiation measurement device according to Embodiment 1 of this invention.
Figure 2:
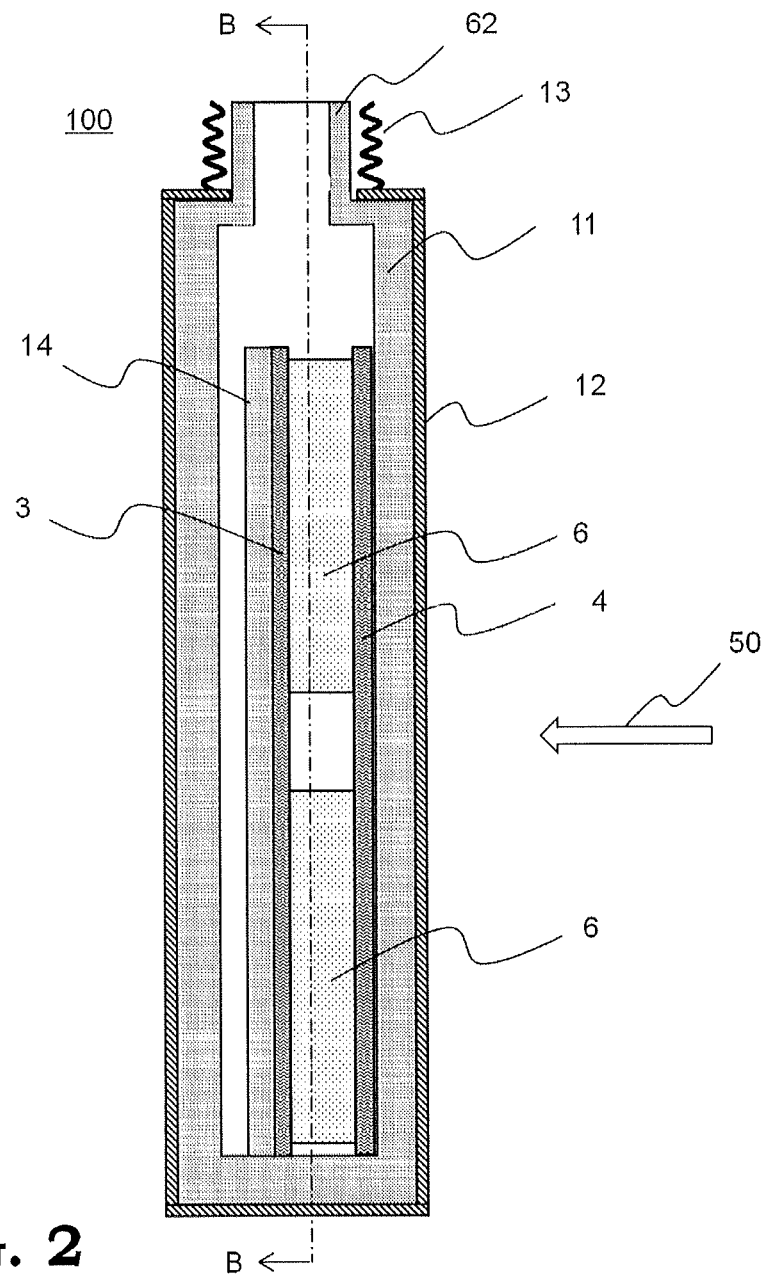
FIG. 2 is a schematic cross-sectional side view showing an outline configuration of a radiation measurement device according to Embodiment 1 of this invention.
Figure 3:
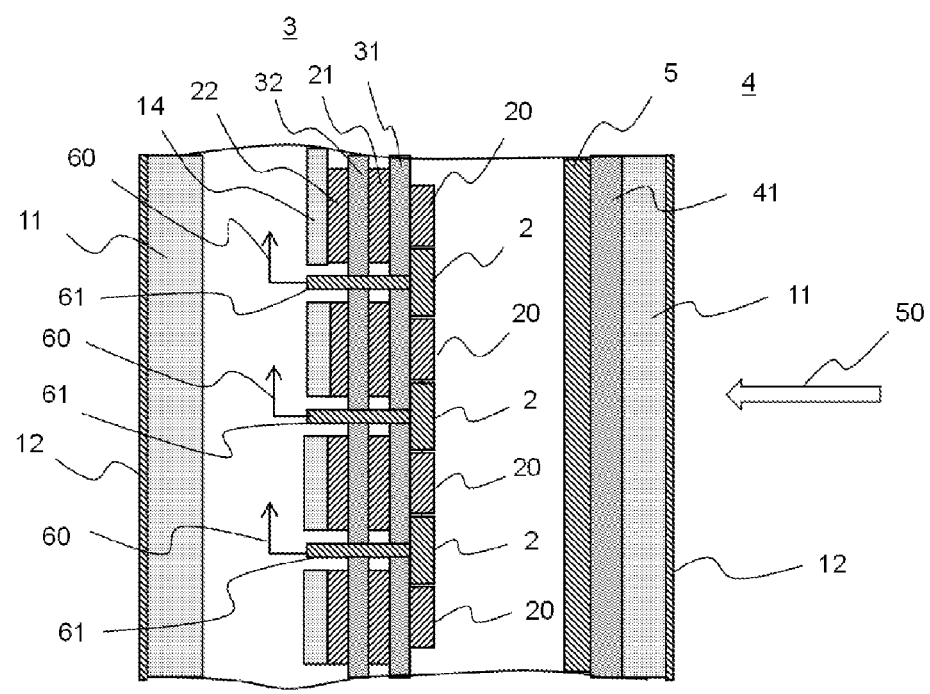
FIG. 3 is an enlarged cross-sectional side view showing the detailed configuration of a radiation measurement device according to Embodiment 1 of this invention.
Figure 4:
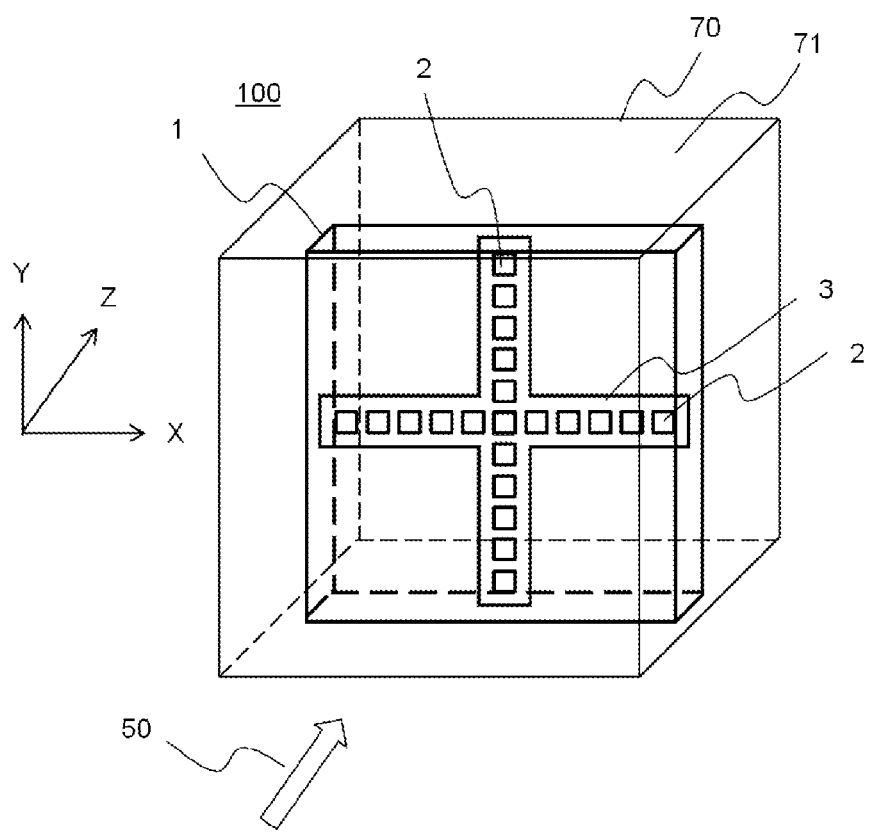
FIG. 4 is a perspective view showing the concept when a radiation measurement device according to Embodiment 1 of this invention is used.

FIG. 1 is a schematic cross-sectional plane view showing a radiation measurement device according to Embodiment 1 of this invention, FIG. 2 is a schematic cross-sectional side view taken on line A-A of FIG. 1 and FIG. 3 is an enlarged cross-sectional side view. FIG. 1 is a sectional view taken on line B-B of FIG. 2. Further, FIG. 4 is a perspective view showing a concept when a radiation measurement device according to Embodiment 1 of this invention is used. First, referring to a perspective view of FIG. 4, an outline of configure of a radiation measurement device of this invention, the condition of the radiation measurement device when it is used will be described. As a whole, a radiation measurement device 100 has the configuration such that in a case 1 which is formed flat, a signal electrode substrate 3 on which a plurality of signal electrodes 2 are arranged in a cross shape, and a common electrode substrate 4 comprising a polyimide substrate 41 on which a common electrode 5 is provided are arranged facing each other having a predetermined gap therebetween as shown in an enlarged cross-sectional view of FIG. 3. Inside of the case 1 is filled with gas which is ionized by radiation 50 such as atmosphere. The radiation measurement device 100 is arranged in a water tank 70 which is filled with water 71. Water in the water tank 70 is water phantom.

As shown in FIG. 3 which is an enlarged cross-sectional view, the signal electrode substrate 3 is multi-layer substrate, on a polyimide substrate 31, a plurality of the signal electrodes 2 are arranged so as to face the common electrode 5. Each of the signal electrode 2 is surrounded by a ground electrode 20 whose potential is ground potential. Between the polyimide substrate 31 and a polyimide substrate 32, a ground electrode 21 whose potential is ground potential is provided, further, at an opposite side of the polyimide substrate 32 where the ground electrode 21 is provided, a ground electrode 22 whose potential is ground potential is provided. The ground electrodes 20, 21 and 22 specify the ground potential which is a reference of a signal electrode substrate, and the ground electrode 20 is a guard electrode of the signal electrode 2. Further, representatively, the common electrode substrate 4 and a polyimide substrate 41, 31 and 32 of the signal electrode substrate 3 have a thickness of several 10 μm, and each electrode has a thickness of 10 to 20 μm, and the common electrode substrate 4 and the signal electrode substrate 3 have a thickness of 100 μm as a whole.

In FIG. 1 and FIG. 4, as a plurality of the signal electrodes 2, the state where approximately ten signal electrodes 2 are arranged in each direction is shown, however, the number of the signal electrode 2 is determined depending on the level of resolution which is necessary for measurement, and in some cases, approximately 100 signal electrodes 2 are arranged as a whole. From each of the signal electrode 2, a lead terminal 61 is led out to a side which is opposite of the common electrode 5, and a signal line 60 is connected. In order to keep appropriate gap between the signal electrode 2 and the common electrode 5 which are facing each other, as shown in FIG. 1 and FIG. 2, a spacer 6 is arranged and the gap between both of the electrodes is filled with atmosphere. A set of the signal electrode substrate 3 and the common electrode substrate 4 which are facing each other having a predetermined gap is attached to a case wall 11 with screws so as for whole of the set to be pressed by a pressing plate 14.

The radiation measurement device 100 having the above-mentioned configuration is installed so as for radiation 50 to enter from a side of the common electrode 5 as indicated by an arrow shown in FIG. 3. Further, in a sectional view of FIG. 2, in order to simplify the FIG., each electrode and a signal line, etc. are omitted, and only the signal electrode substrate 3 and the common electrode substrate 4 are shown. Further, FIG. 4 is a conceptual view when measuring is performed, and the details of the signal line and each electrode are not shown, the case 1 is covered with a conductor as will be described in below, however, in order to clearly show the concept of signal electrode arrangement inside the case, a perspective of an outline of signal electrode is shown.

Between the signal electrode substrate 3 and the common electrode substrate 4, a voltage in which the common electrode substrate 4 is a high voltage is applied, and an electric field is generated between both of the electrodes. Under the above-mentioned state, when the radiation 50 such as a particle beam enters from a direction indicated by an arrow in FIG. 3 and FIG. 4, atmosphere between both electrodes is ionized by the radiation, from each of the signal electrodes 2, a signal which corresponds to an amount of ionization in the vicinity of each of the signal electrode 2 can be taken out. This signal corresponds to the dose of this place, and the cross-shaped two-dimensional dose distribution where a plurality of signal electrodes 2 are arranged can be measured. When measuring is performed by conforming cross-shaped two directions where the signal electrodes 2 are arranged to, for example, X-direction and Y-direction, that is, a scanning axis of a radiation measurement device for making a radiation enter, the distribution of dose along the X-direction and the Y-direction can be measured. Further, the radiation measurement device 100 is serially moved to Z direction which is a travelling direction of the radiation, by measuring the two-dimensional dose distribution, every time the radiation measurement device 100 is moved, the three-dimensional dose distribution can be measured. As above-mentioned, the dose distribution of the radiation in water phantom can be measured.

Signal lines 60 which are connected for leading out a signal of each of the signal electrodes 2 from each of the signal electrodes which are arranged in a cross-shaped are appropriately bundled so as to be led out to the outside of the case 1 as shown in FIG. 1. As above mentioned, the signal lines 60 are wired around, electromagnetic noise is easily induced in the signal lines 60. Therefore, in this invention, an outside of the case wall 11 made of conductive material such as acryl which constitutes the case 1 is covered with a conductor 12. As the conductor 12, a metal whose loss is small with respect to radiation, such as aluminum, is used.

As an inside of the case 1 is filled with atmosphere and an outside of the case 1 is water, it is necessary for whole of the case 1 to withstand hydraulic pressure. Further, as radiation passes through the case wall 11 so as to enter, it is necessary for the case wall 1 to have property which is close to that of water with respect to radiation as much as possible. As a material which satisfies the above-mentioned conditions, for example, an acrylic resin is used for the case wall 11. The acrylic resin is an insulating material and does not have electromagnetic shielding effect. By covering an outside of the case wall 11 with a conductor 12, an inside of the case 1 is electromagnetically shielded from outside, induction of electromagnetic noise from outside of the case 1 in the signal electrode 2, the common electrode 5 and the signal line 60 can be suppressed.

Most of all area of the case 1 is submerged, however, the case 1 is installed so as for a signal line leading out part 62 to be top to prevent the signal line leading out part 62 from submerging. As shown in FIG. 1 and FIG. 2, the circumference of the signal line leading out part 62 is covered with a conductor 13, and the conductor 13 and the conductor 12 are connected so as to be same potential as that of the conductor 12. By performing the above, electromagnetic noise is hardly induced in the signal line 60 which is led out to outside of the case.

As above mentioned, by covering whole of inside of the case 1 and the signal line leading out part 62 with a conductor, the inside of the case 1 and the signal line 60 is electromagnetically shielded from outside, induction of external noise in a signal line can be suppressed, the signal-to-noise ratio can be improved, and dose distribution measurement with a high precision can be performed.

Figure 5:
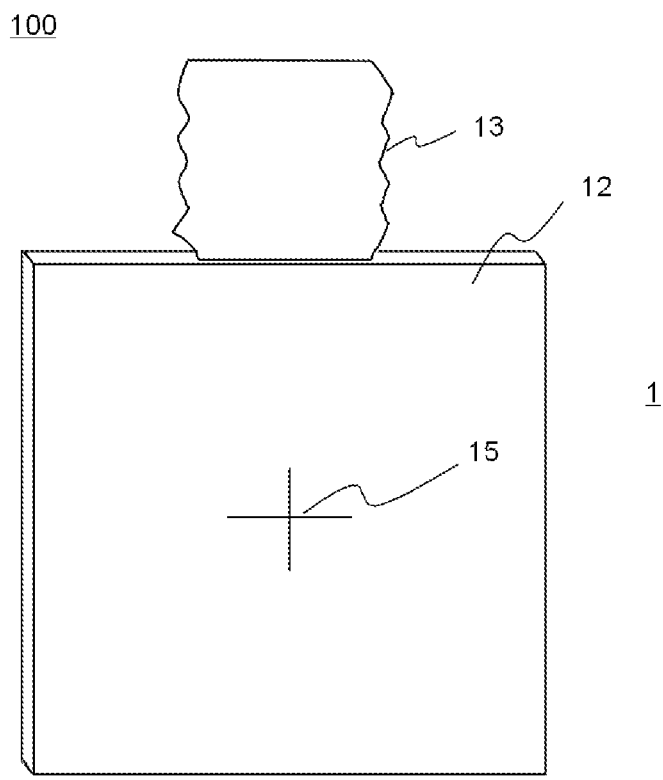
FIG. 5 is a schematic external view showing another configuration of a radiation measurement device according to Embodiment 1 of this invention.

FIG. 5 is an external view showing another configuration of a radiation measurement device according to Embodiment 1 of this invention. As an outside of the case 1 is covered with the conductor 12 such as an aluminum plate, positioning cannot be performed by observing electrode arrangement inside of the case 1. Therefore, for example, a mark 15 showing a center position of cross-shape of a plurality of the signal electrodes 2 which are arranged in a cross shape inside is provided at an outside of the case 1. In a case where radiation is irradiated, positioning of the radiation measurement device 100 can be performed referring to a position of the mark 15.

Figure 6:
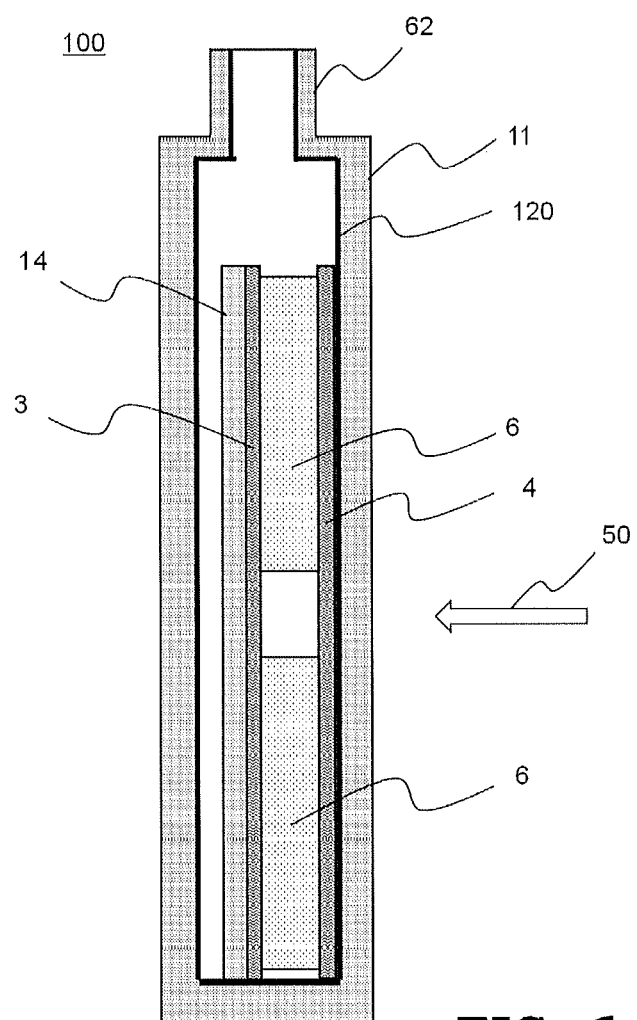
FIG. 6 is a schematic cross-sectional side view showing another configuration of a radiation measurement device according to Embodiment 1 of this invention.

FIG. 6 is a cross-sectional view showing another configuration of a radiation measurement device according to Embodiment 1 of this invention, and is a view which correspond to FIG. 2. In FIG. 2, an outside of the case wall 11 is covered with an aluminum plate as a conductor, however, as shown in FIG. 6, an inner surface of the case 1 may be covered with a conducting film 120 by attaching conducting material to an inside of the case wall 11 by vapor deposition or coating. As the conducting film 120, various kinds of conductive material including a metal such as aluminum, carbon, etc. can be used. In a case of carbon, carbon can be easily coated to a case wall utilizing print technology. Further, it is needless to say such that the above-mentioned conductive film may be provided at an outside of the case wall 11 like the conductor 12 shown in FIG. 2.

As described in the above, regarding a radiation measurement device according to Embodiment 1 of this invention, an inner surface or an outer surface of a case is covered with a conductor, therefore induction of electromagnetic noise from outside of the case can be suppressed, and as a result, dose distribution measurement can be performed with high precision.

Embodiment 2

Figure 7:
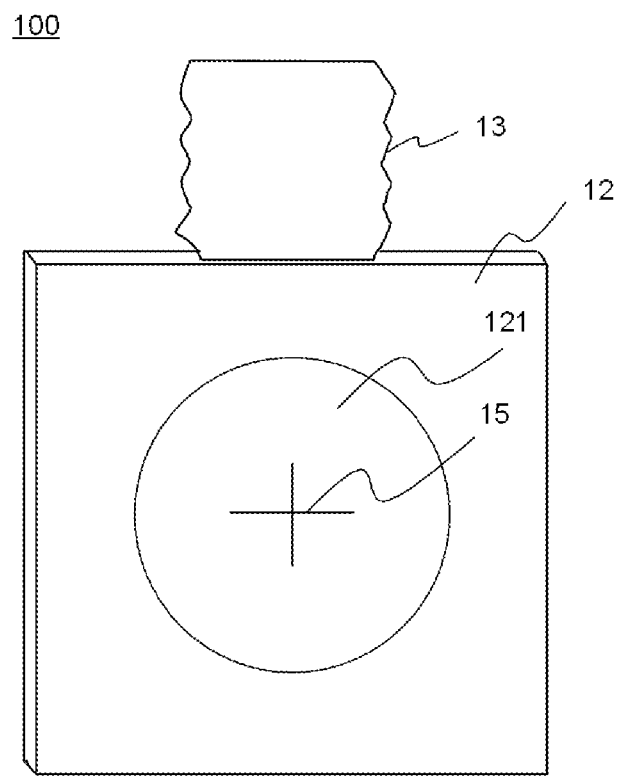
FIG. 7 is a schematic external view showing a configuration of a radiation measurement device according to Embodiment 2 of this invention.
Figure 8:
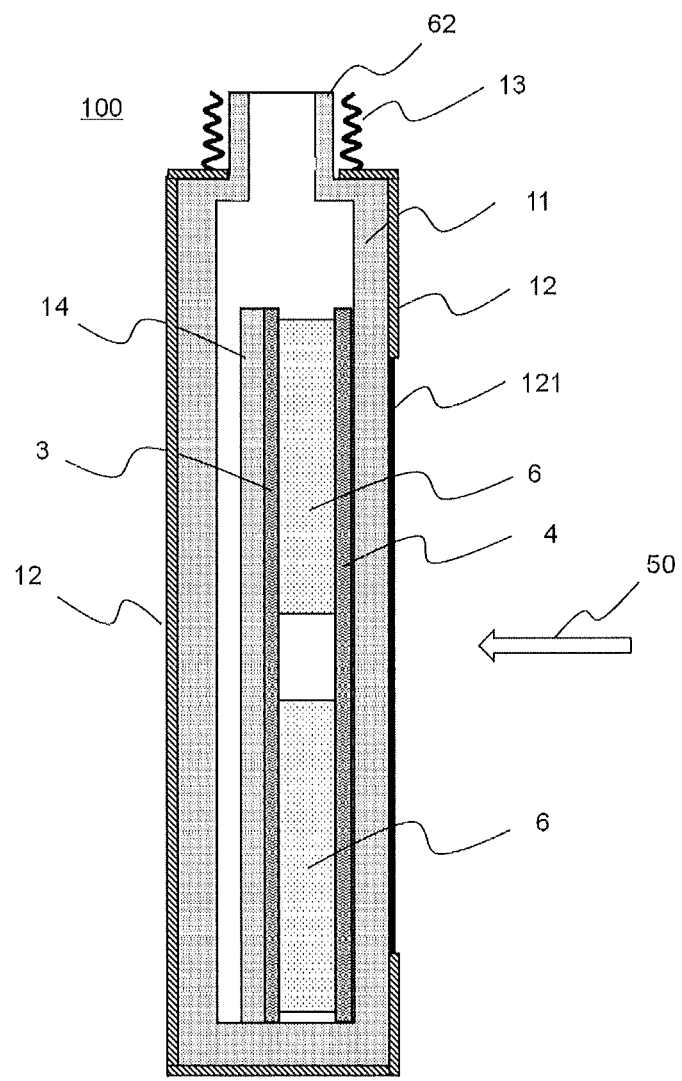
FIG. 8 is a schematic cross-sectional side view showing an outline configuration of a radiation measurement device according to Embodiment 2 of this invention.

FIG. 7 is a schematic external view showing a radiation measurement device according to Embodiment 2 of this invention, and FIG. 8 is a schematic cross-sectional side view showing a radiation measurement device according to EMBODIMENT 2 of this invention and corresponds to FIG. 2 of EMBODIMENT 1. In EMBODIMENT 1, a conductor which covers an outside or inside of a case 1 is formed to have an uniform thickness, however, in EMBODIMENT 2, a conductor 121 is formed to have the configuration such that only a part of a thickness of the conductor where radiation passes when the radiation enters is thinner than that of other part. The thin conductor 121 may be a metal foil such as an aluminum foil or may be formed by coating or depositing a conductive film to an acrylic plate.

When a part of a conductor where radiation enters has a certain thickness, the radiation is absorbed in the conductor, water equivalence as water phantom may be impaired. Therefore, in order to decrease influence with respect to radiation which enters, the thin conductor 121 is formed to have a part where radiation passes when the radiation enters. It is preferable that a thickness of a conductor of this thin part is made as small as possible, and in a case of aluminum, it is preferable that a thickness is 100 μm or smaller. Even when a part of a conductor is thin, a radiation measurement device has the configuration such that whole of the case 1 is covered with a conductor, the whole of the case 1 has the same potential and an electromagnetic noise from outside can be shielded.

According to EMBODIMENT 2, whole of the case is covered with a conductor, and a part of the conductor where radiation enters is made thinner, in the same way as that of EMBODIMENT 1, induction of electromagnetic noise from outside of the case in a signal line can be suppressed, dose measurement with higher precision and with less influence on radiation which enters can be performed.

Embodiment 3

Figure 9:
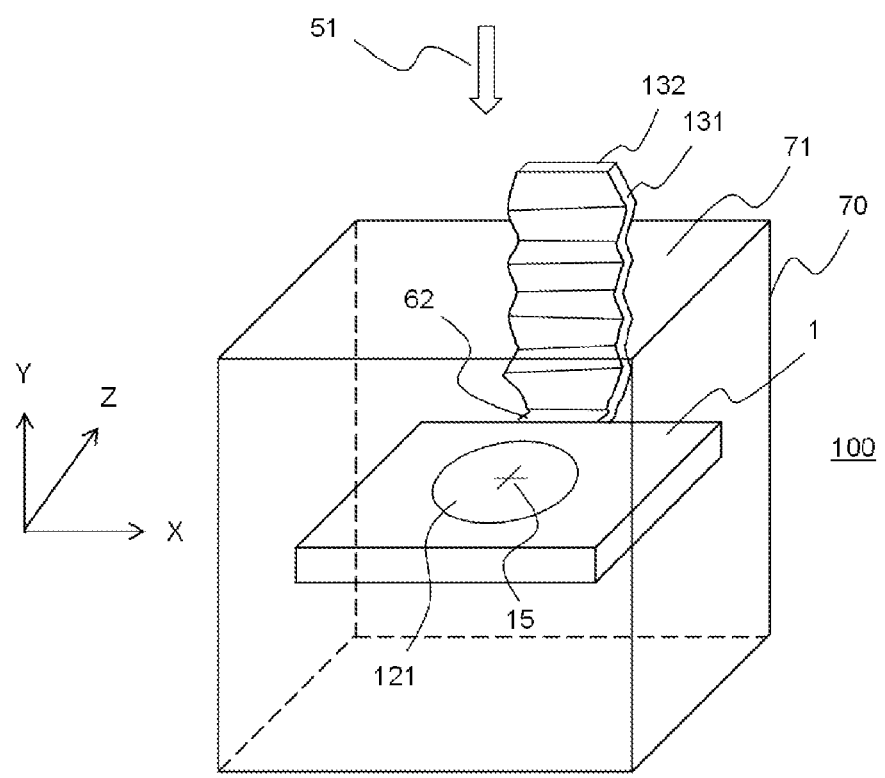
FIG. 9 is a perspective view showing the concept when a radiation measurement device according to Embodiment 3 of this invention is used.

FIG. 9 is a perspective view showing the concept when a radiation measurement device according to Embodiment 3 of this invention is used. As utilization of radiation, in a case where radiation is used for medical therapy, for example, there is a case where radiation is irradiated to a patient from various angles using gantry-type radiation irradiation system. In this case, it is necessary to measure radiation which is irradiated from various angles by using a radiation measurement device of this invention. FIG. 4 shows an example in which radiation which is irradiated from a horizontal direction is shown, however, FIG. 9 shows an example in which radiation which is irradiated to a direction indicated by an arrow 51, that is, a direction which conforms to a direction of gravitational force (minus Y direction) is measured in water phantom by using a radiation measurement device of this invention. In this case, it is necessary to install the radiation measurement device 100 so as for a direction where the radiation measurement device 100 extends to be flat to be horizontal. On the other hand, in a case 1, it is necessary for atmosphere to enter or leave freely.

The case 1 is submerged in water phantom, that is, in water, therefore, a signal line leading out part 62 is also submerged and water enters the inside of the case 1. In order to prevent water from entering, a conductor 131 which covers a signal line which extends from the signal line leading out part 62 is made to be a deformable conductor 131, for example, a conductor having accordion-fold, the deformable conductor 131 is provided so as to extend to be on a surface of water. By connecting water-tightly the deformable conductor 131 and the case 1 so as for water not to enter from a connected part, water will not enter the case 1. Further, as a signal line passes through the deformable conductor 131, the case is shielded electromagnetically, and influence of electromagnetic noise can be decreased. Further, from an opening part 132 of the deformable conductor 131, atmosphere can enter the case or leave from the case freely.

FIG. 9 shows a case in which radiation is irradiated from a direction of gravitational force, however, in a case where radiation is irradiated from other directions, with respect to an irradiation direction of radiation, a radiation measurement device 100 may be installed so as for a direction where a radiation measurement device 100 extends to be perpendicular, and so as for the opening part 132 of the deformable conductor 131 to be on the surface of water of water phantom. As above mentioned, by covering a signal line with the deformable conductor 131 which extends from the signal line leading out part 62, a radiation measurement device in which the signal line can be shielded electromagnetically, water infiltration can be prevented, and atmosphere can enter the case or leave from the case can be obtained.

Further, in his invention, within the scope of this invention, each embodiment may be combined or each embodiment may be changed properly or omitted.

REMARKS

1: case
2: signal electrode
3: signal electrode substrate
4: common electrode substrate
5: common electrode
6: spacer
11: case wall
12, 13, 120: conductor
14: pressing plate
20, 21, 22: potential electrode
70: water tank
71: water
50: radiation
60: signal line
62: signal line leading out part
131: deformable conductor
100: radiation measuring device

The invention claimed is:

1. A radiation measurement device, comprising:
a case that is flat and formed of an insulating material,
a common electrode substrate with a common electrode which is provided at one surface, and
a signal electrode substrate with a plurality of signal electrodes which are provided at one surface,
wherein the common electrode substrate and the signal electrode substrate are arranged parallel to the direction in which the case extends flat so the common electrode and the signal electrode face each other with a gap therebetween, each signal line is connected to each of the plurality of signal electrodes, each of the signal lines is led out from a signal line leading out part which is provided at the case to outside of the case, and
wherein an inner surface or an outer surface of a case wall which forms the case is covered with a conductor;
a deformable conductor which covers the signal lines which are led out from the case is connected with the case water-tightly; and
in a case where the case is submerged in water phantom, an opening of the deformable conductor is provided above a surface of water so as for atmosphere to enter from the opening of the deformable conductor to inside of the case.

2. The radiation measurement device according to claim 1, wherein the plurality of signal electrodes are arranged in a cross shape.

3. The radiation measurement device according to claim 1, wherein at least a part of the conductor where radiation enters is thinner than other parts.

4. The radiation measurement device according to claim 3, wherein the thinner part of the conductor is made of aluminum and has a thickness of 100 µm or smaller.

5. The radiation measurement device according to claim 3, wherein the conductor is an aluminum plate and at least a part where radiation enters is a metal film.

6. The radiation measurement device according to claim 1, wherein the conductor is an aluminum plate.

7. The radiation measurement device according to claim 1, wherein the conductor is a metal film which is formed on an inner surface or an outer surface of the case wall.

8. The radiation measurement device according to claim 1, wherein the conductor is a carbon film which is formed on an inner surface or an outer surface of the case wall.

* * * * *